(12) United States Patent
Maura

(10) Patent No.: US 10,858,012 B2
(45) Date of Patent: Dec. 8, 2020

(54) AUTONOMOUS DRIVING ASSISTANCE DEVICE AND COMPUTER PROGRAM

(71) Applicant: AISIN AW CO., LTD., Anjo (JP)

(72) Inventor: Masao Maura, Seto (JP)

(73) Assignee: AISIN AW CO., LTD., Anjo (JP)

( * ) Notice: Subject to any disclaimer, the term of this patent is extended or adjusted under 35 U.S.C. 154(b) by 186 days.

(21) Appl. No.: 16/095,582

(22) PCT Filed: May 17, 2017

(86) PCT No.: PCT/JP2017/018516
§ 371 (c)(1),
(2) Date: Oct. 22, 2018

(87) PCT Pub. No.: WO2017/200003
PCT Pub. Date: Nov. 23, 2017

(65) Prior Publication Data
US 2019/0084579 A1    Mar. 21, 2019

(30) Foreign Application Priority Data
May 20, 2016    (JP) ................. 2016-101234

(51) Int. Cl.
*B60W 50/00*    (2006.01)
*B60W 30/12*    (2020.01)
(Continued)

(52) U.S. Cl.
CPC ........ *B60W 50/0098* (2013.01); *B60W 30/10* (2013.01); *B60W 30/12* (2013.01);
(Continued)

(58) Field of Classification Search
CPC .. B60W 30/10; B60W 30/12; B60W 50/0098; G05D 1/0212; G05D 2201/0213; G08G 1/00; G01C 21/26
See application file for complete search history.

(56) References Cited

U.S. PATENT DOCUMENTS

2016/0052547 A1*  2/2016  Kashiwai ............ B60W 40/076
                                                                701/41
2019/0092330 A1*  3/2019  Ide ........................ G01S 13/867

FOREIGN PATENT DOCUMENTS

JP    2001-141467 A    5/2001
JP    2009-40267 A    2/2009
(Continued)

OTHER PUBLICATIONS

Aug. 1, 2017 International Search Report issued in International Application No. PCT/JP2017/018516.

*Primary Examiner* — Rachid Bendidi
(74) *Attorney, Agent, or Firm* — Oliff PLC

(57) ABSTRACT

Autonomous driving assistance devices, methods and programs generate assistance information to be used in autonomous driving assistance that is executed in a vehicle. The devices, methods and programs set a target travel trajectory that is an aimed travel trajectory for a road on which the vehicle travels and set a control target point to a position that is located on the target travel trajectory and ahead of a trajectory generation start point in a direction in which the vehicle is traveling based on a type of autonomous driving assistance being executed in the vehicle. The devices, methods and programs generate a control trajectory to be followed by the vehicle by using a trajectory from the trajectory generation start point to the control target point.

9 Claims, 9 Drawing Sheets

(51) Int. Cl.
*B60W 30/10* (2006.01)
*G08G 1/00* (2006.01)
*B60W 30/18* (2012.01)
*G05D 1/02* (2020.01)
*G01C 21/26* (2006.01)

(52) U.S. Cl.
CPC ..... *B60W 30/18163* (2013.01); *G05D 1/0212* (2013.01); *G08G 1/00* (2013.01); *G01C 21/26* (2013.01); *G05D 2201/0213* (2013.01)

(56) References Cited

FOREIGN PATENT DOCUMENTS

| | | |
|---|---|---|
| JP | 2013-112067 A | 6/2013 |
| JP | 2013-112068 A | 6/2013 |
| JP | 2014-218098 A | 11/2014 |

\* cited by examiner

FIG. 10
"LANE KEEPING DRIVING ASSISTANCE"
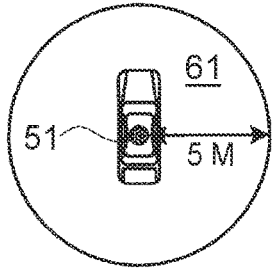
FIG. 11
"LANE CHANGE ASSISTANCE"
FIG. 12
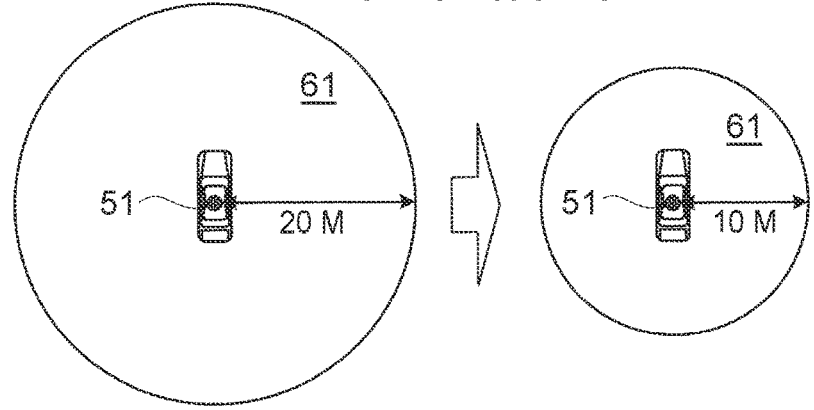
| TRAVEL TIME t (MS) | 0 | 100 | 200 | 300 | 400 | 500 | 600 | 700 | 800 | 900 | 1000 | 1100 |
|---|---|---|---|---|---|---|---|---|---|---|---|---|
| TYPE OF ASSIST-ANCE | LANE KEEP | LANE KEEP | LANE CHANGE | LANE CHANGE | LANE CHANGE | LANE CHANGE | LANE CHANGE | LANE CHANGE | LANE CHANGE | LANE CHANGE | LANE CHANGE | LANE CHANGE |
| EXCLUSION RANGE DISTANCE (M) | 5 | 5 | 20 | 19 | 18 | 17 | 16 | 15 | 14 | 13 | 12 | 11 |
| 1200 | 1300 | 1400 | 1500 | 1600 | 1700 | 1800 | 1900 | 2000 |
|---|---|---|---|---|---|---|---|---|
| LANE CHANGE | LANE CHANGE | LANE CHANGE | LANE KEEP | LANE KEEP | LANE KEEP | LANE KEEP | LANE KEEP | LANE KEEP |
| 10 | 10 | 10 | 9 | 8 | 7 | 6 | 5 | 5 |

AUTONOMOUS DRIVING ASSISTANCE DEVICE AND COMPUTER PROGRAM

TECHNICAL FIELD

Related technical fields include autonomous driving assistance devices, methods, and computer programs which execute autonomous driving assistance in vehicles.

BACKGROUND

In recent years, in addition to manual driving in which a vehicle travels based on user's driving maneuvers, a new drive mode has been proposed regarding autonomous driving assistance systems that assist the user in driving a vehicle by performing a part or all of user's driving maneuvers by the vehicle. For example, the autonomous driving assistance system detects the vehicle's current position, the vehicle's lane, and the position of other traffic around the vehicle as needed and autonomously performs vehicle control such as control of steering, a driving source, and a brake so that the vehicle travels along a preset route.

In autonomous driving assistance, a vehicle is basically controlled to follow a predetermined target travel trajectory (e.g., the centerline of a lane in which the vehicle should travel) as much as possible. For example, Japanese Patent Application Publication No. 2013-112067 (JP 2013-112067 A) proposes a technique in which, if the travel position of a vehicle has deviated from its travel route, namely its target travel trajectory, a target waypoint located within a predetermined range from the vehicle's current position, out of target waypoints located at predetermined intervals on this travel route, is set as a fixed target waypoint, and a new travel route running from the vehicle's current position and passing through the fixed target waypoint is generated.

SUMMARY

There are various types of autonomous driving assistance that are executed in vehicles. Examples of such autonomous driving assistance include lane keeping driving assistance for keeping a vehicle in the same lane and lane change assistance for moving a vehicle to a different lane. In the technique of JP 2013-112067 A, a target waypoint located within the predetermined range from the vehicle's current position is set as a fixed target waypoint, regardless of the type of autonomous driving assistance being executed in the vehicle.

As a result, in the technique of JP 2013-112067 A, a new travel route that is not appropriate for the type of autonomous driving assistance being executed in the vehicle may be generated. For example, if the vehicle has significantly deviated from a preset travel route for various reasons such as other approaching traffic or a lane change or changes, a new travel route that involves a sharp turn or turns may be generated in order to return the vehicle to a target travel trajectory. In such a case, autonomous driving assistance may not be executed appropriately.

Exemplary embodiments of the broad inventive principles described herein address the conventional problem, and have an object to provide autonomous driving assistance devices, methods, and programs that can generate a control trajectory having a shape corresponding to the type of autonomous driving assistance in the case where a vehicle is traveling with autonomous driving assistance and which can appropriately and continuously execute autonomous driving assistance.

Exemplary embodiments provide devices, methods, and programs that generate assistance information to be used in autonomous driving assistance that is executed in a vehicle. The devices, methods and programs set a target travel trajectory that is an aimed travel trajectory for a road on which the vehicle travels and set a control target point to a position that is located on the target travel trajectory and ahead of a trajectory generation start point in a direction in which the vehicle is traveling based on a type of autonomous driving assistance being executed in the vehicle. The devices, methods and programs generate a control trajectory to be followed by the vehicle by using a trajectory from the trajectory generation start point to the control target point.

The term "autonomous driving assistance" refers to the function to perform at least a part of driver's vehicle maneuvers on behalf of the driver or to assist the driver with at least a part of driver's vehicle maneuvers.

According to the autonomous driving assistance device and the computer program that have the above configuration, a control trajectory having a shape corresponding to the type of autonomous driving assistance can be generated in the case where a vehicle is traveling with autonomous driving assistance. For example, generation of a control trajectory with a small radius of turn is therefore prevented during execution of autonomous driving assistance in which driving with sharp turns is not appropriate. Generation of a control trajectory that causes frequent changes in bearing of the vehicle is also prevented during execution of autonomous driving assistance in which frequent changes in angle of the vehicle body are not appropriate. As a result, autonomous driving assistance can be continuously and appropriately executed.

BRIEF DESCRIPTION OF THE DRAWINGS

FIG. 10 is a diagram showing an exclusion range that is set in the case where lane keeping driving assistance is being executed in a vehicle.

FIG. 11 is a diagram showing exclusion ranges that are set in the case where lane change assistance is being executed in a vehicle.

FIG. 12 is a table showing a specific example of setting an exclusion range for various travel times t.

DETAILED DESCRIPTION OF EXEMPLARY EMBODIMENTS

Figure 1:
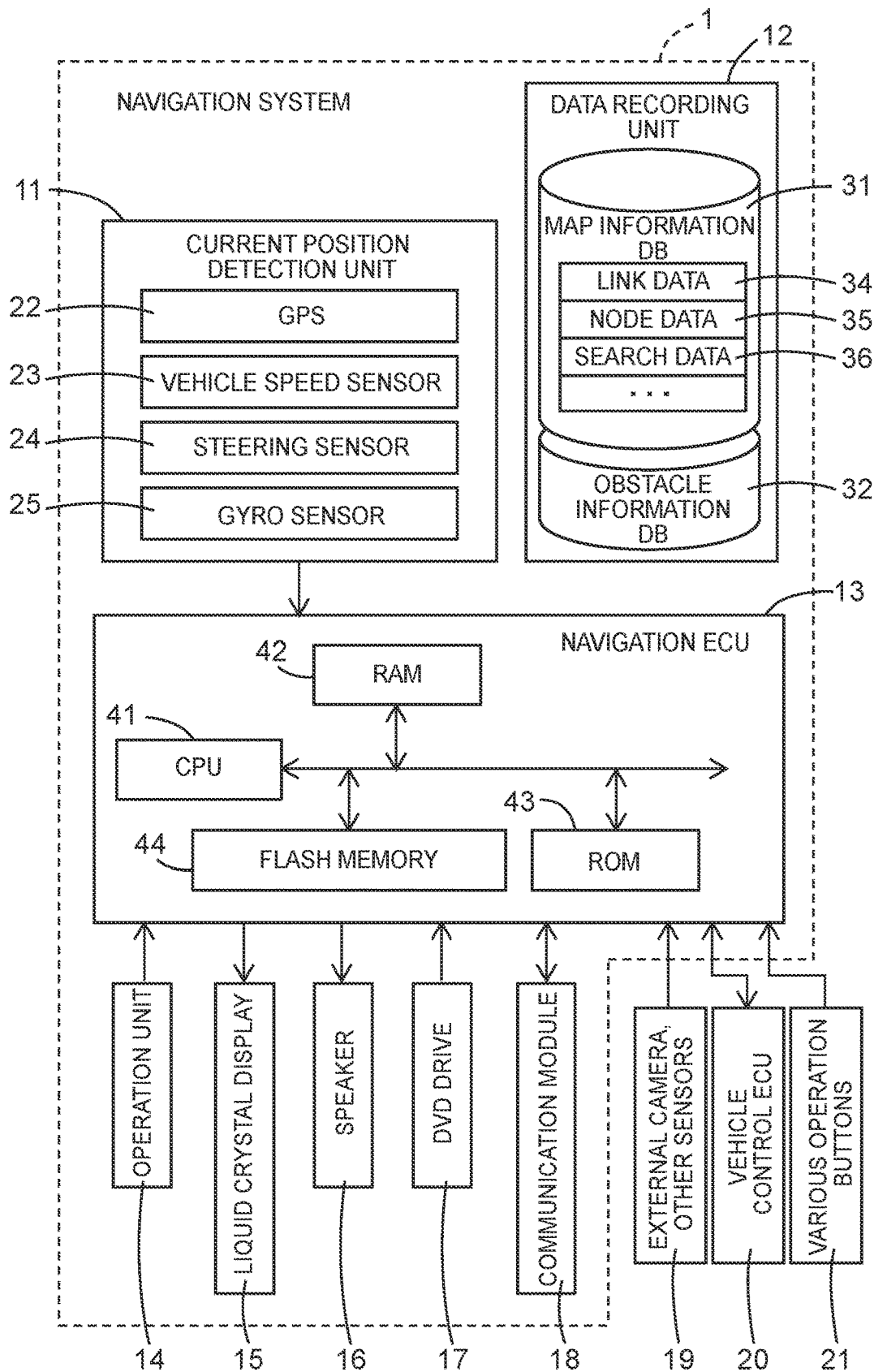
FIG. 1 is a block diagram of a navigation system according to an embodiment.

An autonomous driving assistance device will be described in detail below based on an embodiment of a navigation system with reference to the accompanying drawings. First, the general configuration of a navigation system 1 according to an embodiment will be described with reference to FIG. 1. FIG. 1 is a block diagram of the navigation system 1 according to the embodiment.

As shown in FIG. 1, the navigation system 1 according to the embodiment has: a current position detection unit 11 that detects the current position of a vehicle equipped with the navigation system 1; a data recording unit 12 having various data recorded thereon; a navigation ECU 13 that performs various arithmetic operations based on received information; an operation unit 14 that accepts user's operations; a liquid crystal display 15 that displays to the user a map around the vehicle, information about a guidance route set by the navigation system 1 (a planned travel route to be taken by the vehicle), etc.; a speaker 16 that outputs voice guidance about the route; a DVD drive 17 that reads a DVD serving as a storage medium; and a communication module 18 that communicates with an information center such as a probe center or a Vehicle Information and Communication System (VICS (registered trademark)) center. (As used herein, the term "storage medium" does not encompass transitory signals.) An external camera 19 and various sensors, which are mounted on the vehicle equipped with the navigation system 1, are connected to the navigation system 1 via an in-vehicle network such as a CAN. A vehicle control ECU 20 that performs various controls of the vehicle equipped with the navigation system 1 is also connected to the navigation system 1 so that the navigation system 1 and the vehicle control ECU 20 can communicate bidirectionally with each other. Various operation buttons 21 mounted on the vehicle, such as an autonomous driving start button, are also connected to the navigation system 1.

The components of the navigation system 1 will be sequentially described below.

The current position detection unit 11 is comprised of a GPS 22, a vehicle speed sensor 23, a steering sensor 24, a gyro sensor 25, etc. and can detect the current position and bearing of the vehicle, the traveling speed of the vehicle, the current time, etc. In particular, the vehicle speed sensor 23 is a sensor that detects the distance traveled by the vehicle and the vehicle speed. The vehicle speed sensor 23 generates pulses according to rotation of drive wheels of the vehicle and outputs pulse signals to the navigation ECU 13. The navigation ECU 13 counts the number of generated pulses to calculate the rotational speed of the drive wheels and the traveled distance. The navigation system 1 need not necessarily include all of these four sensors. The navigation system 1 may include only one or more of these sensors.

The data recording unit 12 includes a hard disk (not shown) serving as an external storage device and a recording medium, and a recording head (not shown) serving as a driver for reading a map information DB 31, an obstacle information DB 32, predetermined programs, etc., which are recorded on the hard disk, and writing predetermined data on the hard disk. The data recording unit 12 may have a flash memory, a memory card, or an optical disk such as a CD or a DVD instead of the hard disk. The map information DB 31 may be stored in an external server, and the navigation system 1 may obtain data from the map information DB 31 by communication with the external server.

The map information DB 31 is storage means having stored therein, e.g., link data 34 regarding roads (links), node data 35 regarding node points, search data 36 that is used for processing associated with route searches and route changes, facility data regarding facilities, map display data for displaying a map, intersection data regarding intersections, search data for searching for locations, etc.

The link data 34 includes: regarding links of roads, data indicating the width, gradient, cant, and bank, and surface condition of the road to which the link belongs, shape interpolation point data for specifying the shape of the link between nodes (e.g., the shape of the curve in the case of a curved road), and data indicating a merging section, the road structure, the number of lanes of the road, a location where the number of lanes decreases, a location where the road narrows, a railroad crossing, etc.; regarding corners, data indicating the radius of curvature, an intersection, a T-junction, the entrance and exit of the corner, etc.; regarding road attributes, data indicating a downhill road, an uphill road, etc.; and regarding road types, data indicating a local road such as a national road, a prefectural road, or a narrow street, and a toll road such as a national expressway, an urban expressway, a limited-access highway, a local toll road, or a toll bridge. In particular, in the present embodiment, the link data 34 further includes information that specifies the lane use for each lane, namely in which direction the vehicle must travel in each lane, and road connections (specifically, which lane is connected to which road at a diverge), in addition to the number of lanes of the road. The link data 34 further includes speed limits set for roads.

The node data 35 includes data regarding the coordinates (positions) of node points that are set at diverge points (including intersections, T-junctions, etc.) of actual roads and that are set at predetermined intervals on each road according to the radius of curvature etc., node attributes indicating whether the node is a node corresponding to an intersection or not etc., a connection link number list that is a list of link numbers of links connecting to the node, an adjacent node number list that is a list of node numbers of nodes each located adjacent to the node with a link therebetween, the height (altitude) of each node point, etc.

The search data 36 includes various data to be used for route search processing of searching for a route from a departure point (e.g., the vehicle's current position) to a set destination. Specifically, the search data 36 includes cost calculation data to be used to calculate search cost such as cost showing a quantified level of appropriateness of a route regarding an intersection (hereinafter referred to as intersection cost) and cost showing a quantified level of appropriateness of a route regarding each link of a road (hereinafter referred to as link cost).

The obstacle information DB 32 is storage means for storing obstacle information about obstacles which is sent from an external server. The obstacle information DB 32 further stores obstacle information about any obstacle around the vehicle which is detected by the external camera 19 or a sensor of the vehicle. Obstacles whose obstacle information is stored in the obstacle information DB 32 are objects (factors) that affect autonomous driving assistance that is executed in a manner that will be described later in the vehicle. Examples of the obstacles include other traffic traveling around the vehicle, vehicles parked on roads, work zones, and vehicles in a traffic jam. For example, the obstacle information contains the type of obstacle, position coordinates of the obstacle on a map (in the case where the obstacle extends over an area, information specifying the area), and information specifying details of the obstacle. The navigation ECU 13 executes autonomous driving assistance by using the map information stored in the map information DB 31 and the obstacle information stored in the obstacle information DB 32 as described below.

Drive modes of the vehicle include assisted driving with autonomous driving assistance in which the vehicle autonomously travels along a preset route or along the road without user's driving maneuvers, in addition to manual driving in which the vehicle travels based on user's driving maneuvers. For example, in vehicle control for autonomous driving assistance, the vehicle's current position, the vehicle's lane, and the position of any obstacle around the vehicle are detected as needed, and the vehicle control ECU 20 autonomously performs vehicle control such as control of steering, a driving source, and a brake so that the vehicle travels along a preset route. In assisted driving with autonomous driving assistance of the present embodiment, lane changes and right and left turns are also made by autonomous driving control. However, not all of lane changes and right and left turns may be made by autonomous driving control.

Specifically, in the present embodiment, one of the following two types of autonomous driving assistance is basically executed except under special circumstances such as right and left turns, merges, and diverges.

(1) "Lane keeping driving assistance" . . . . Control to keep the vehicle approximately centered in its lane without causing lane deviation (e.g., lane keeping assistance).

(2) "Lane change assistance" . . . . Control to move the vehicle from its current lane to a different lane.

Which of the assistance controls (1), (2) is to be executed is determined based on a target travel trajectory, namely an aimed travel trajectory set for a road on which the vehicle travels. Control to keep a certain distance (e.g., 10 m) from a vehicle ahead, control to drive at a constant speed (e.g., 80% of speed limit), etc. is performed in parallel with the control (1), (2).

Autonomous driving assistance may be executed either in all road sections or may be executed only while the vehicle is traveling on a specific road section (e.g., a freeway having gates (either manned or unmanned, and either toll or toll-free) at boundaries). In the following description, it is assumed that autonomous driving sections where autonomous driving assistance for the vehicle is executed are all road sections including local roads and freeways and that the above autonomous transmission assistance is basically executed while the vehicle is traveling on a road. However, autonomous driving assistance is not necessarily executed when the vehicle travels in an autonomous driving section, but is executed only in the situation where execution of autonomous driving assistance is selected by the user (e.g., the autonomous driving start button is turned on) and it is determined that the vehicle can travel with autonomous driving assistance. Autonomous driving assistance will be described in detail later.

The navigation electronic control unit (ECU) 13 is an electronic control unit that generally controls the navigation system 1. The navigation ECU 13 includes: a CPU 41 serving as an arithmetic unit and a control unit; and internal storage devices such as a RAM 42 that is used as a working memory when the CPU 41 performs various arithmetic operations and that stores route data etc. when a route search is conducted, a ROM 43 having recorded thereon an autonomous driving assistance program (see FIG. 2) described below etc. in addition to a control program, and a flash memory 44 that stores a program read from the ROM 43. The navigation ECU 13 has various means serving as processing algorithms. For example, travel trajectory setting means sets a target travel trajectory that is an aimed travel trajectory for a road on which the vehicle travels. Control target point setting means sets a control target point to a position that is located on the target travel trajectory and ahead of a trajectory generation start point in the direction in which the vehicle is traveling based on the type of autonomous driving assistance being executed in the vehicle. Control trajectory generating means generates a control trajectory to be followed by the vehicle by using a trajectory from the trajectory generation start point to the control target point.

The operation unit 14 is operated to enter a departure point as a travel start point and a destination as a travel end point etc. and has a plurality of operation switches (not shown) such as various keys and buttons. The navigation ECU 13 performs control so as to execute various associated operations based on switch signals that are output in response to depression etc. of the switches. The operation unit 14 may have a touch panel that is provided on the front surface of the liquid crystal display 15. Alternatively, the operation unit 14 may have a microphone and a speech recognition device.

A map image including roads, traffic information, operation guidance, an operation menu, key guidance, guidance information on a guidance route, news, a weather forecast, time, emails, TV programs, etc. are displayed on the liquid crystal display 15. An HUD or an HIVID may be used instead of the liquid crystal display 15.

The speaker 16 outputs voice guidance for travel along the guidance route and guidance of traffic information, based on a command from the navigation ECU 13.

The DVD drive 17 is a drive that can read data recorded on a recording medium such as a DVD or a CD. The DVD drive 17 plays music or videos, updates the map information DB 31, etc. based on the read data. A card slot for reading and writing a memory card may be provided instead of the DVD drive 17.

The communication module 18 is a communication device that receives traffic information, probe information, weather information, etc. transmitted from a traffic information center such as, e.g., a VICS center or a probe center. For example, the communication module 18 is a mobile phone or a DCM. Other examples of the communication module 18 include a vehicle-to-vehicle communication device for communication between vehicles, and a roadside-to-vehicle communication device for communication between a vehicle and a roadside unit.

The external camera 19 is, e.g., a camera using a solid state imaging element such as a CCD. The external camera 19 is attached above a front bumper of the vehicle and is mounted such that its optical axis is tilted downward at a predetermined angle with respect to the horizontal direction. The external camera 19 captures an image of the road ahead in the direction in which the vehicle is traveling, when the vehicle is traveling in an autonomous driving section. The vehicle control ECU 20 processes the captured image to detect road markings on the road on which the vehicle travels, obstacles such as other traffic around the vehicle, etc., and executes autonomous driving assistance for the vehicle based on the detection result. The external camera 19 may be placed on the rear or side part of the vehicle instead of on the front part of the vehicle. Instead of the camera, a sensor such as a millimeter wave radar or a laser sensor, vehicle-to-vehicle communication, or roadside-to-vehicle communication may be used as means for detecting obstacles.

The vehicle control ECU 20 is an electronic control unit that controls the vehicle equipped with the navigation system 1. The vehicle control ECU 20 is connected to each driving part of the vehicle such as steering, a brake, and an accelerator. In the present embodiment, the vehicle control ECU 20 executes autonomous driving assistance for the vehicle by controlling each driving part, particularly after autonomous driving assistance is started in the vehicle. When the user performs an override during autonomous driving assistance, the vehicle control ECU 20 detects the override.

The navigation ECU 13 sends command signals regarding autonomous driving assistance to the vehicle control ECU 20 via a CAN after the vehicle starts to travel. In response to the received command signals, the vehicle control ECU 20 executes autonomous driving assistance after the vehicle starts to travel. The command signals contain information indicating a trajectory to be followed by the vehicle, the speed at which the vehicle should travel, etc.

Figure 2:
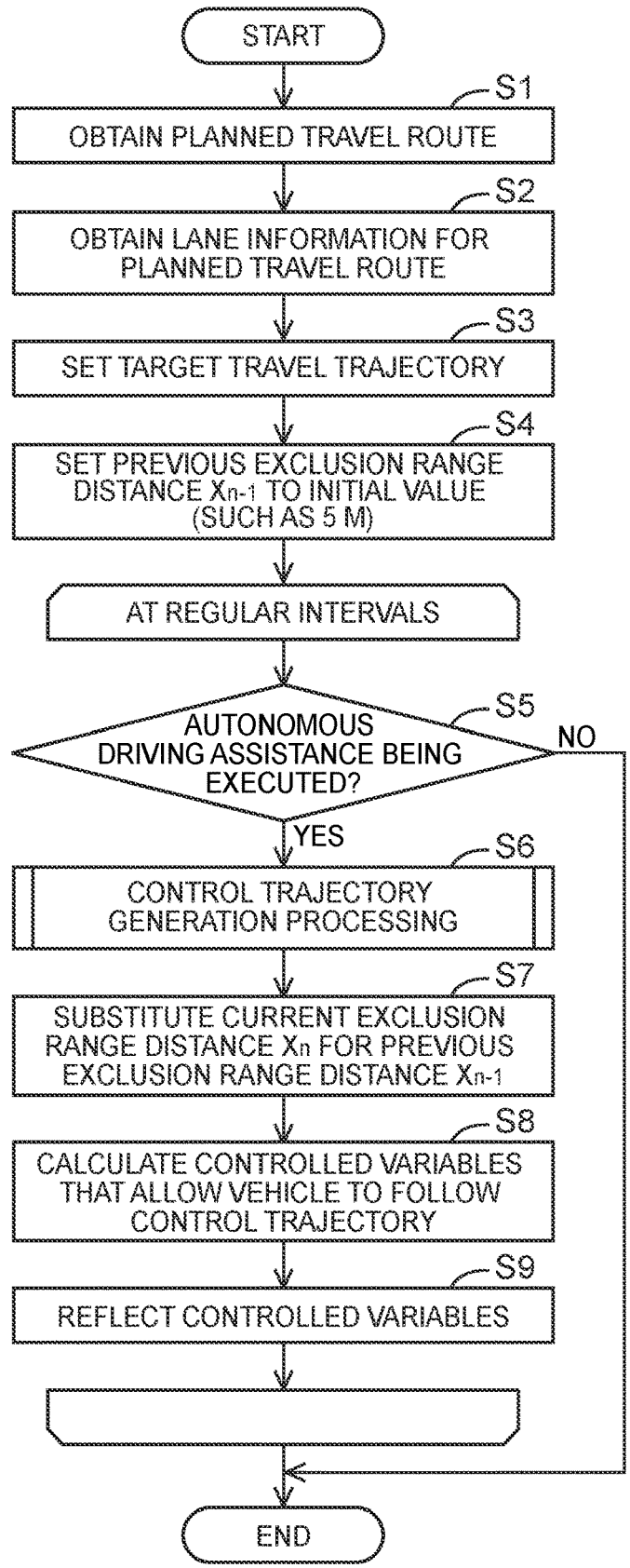
FIG. 2 is a flowchart of an autonomous driving assistance program according to the embodiment.

The autonomous driving assistance program that is executed by the CPU 41 in the navigation system 1 of the present embodiment having the above configuration will be described based on FIG. 2. FIG. 2 is a flowchart of the autonomous driving assistance program according to the present embodiment. The autonomous driving assistance program is a program that is executed in the case where driving with autonomous driving assistance has been started after turning on an accessory power supply (ACC power supply) of the vehicle and that executes autonomous driving assistance for the vehicle so that the vehicle follows a set target travel trajectory. The program shown by the flowcharts of FIGS. 2, 5, and 9 described below is stored in the RAM 42 or the ROM 43 of the navigation system 1 and is executed by the CPU 41.

In the autonomous driving assistance program, the CPU 41 first obtains, in step (hereinafter abbreviated as S) 1, a planned route to be taken by the vehicle (hereinafter referred to as the planned travel route). In the case where a guidance route has been set by the navigation system 1, the planned travel route to be taken by the vehicle is a route from the vehicle's current position to a destination out of the guidance route currently set by the navigation system 1. The guidance route is a recommended route from the departure point to the destination set by the navigation system 1 and is searched by, e.g., Dijkstra's algorithm that is known in the art. In the case where no guidance route has been set by the navigation system 1, the planned travel route is a route running along the road from the vehicle's current position.

Next, in S2, the CPU 41 obtains from the map information DB 31 lane information about lanes in the planned travel route. Specifically, the CPU 41 obtains information specifying the number of lanes of each road included in the planned travel route and the lane use for each lane, namely in which direction the vehicle must travel in each lane, and road connections (specifically, which lane is connected to which road at a diverge).

Figure 3:
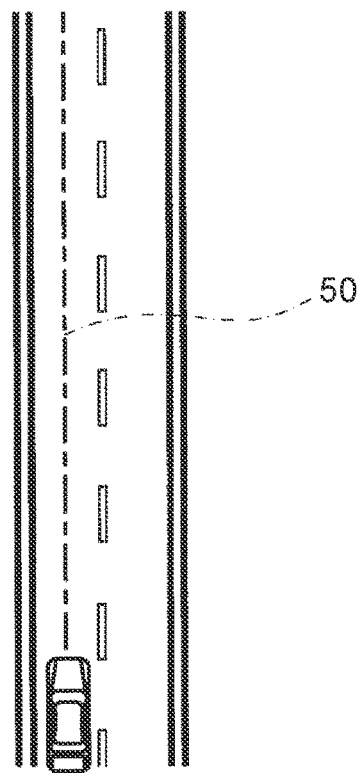
FIG. 3 is a diagram showing an example of a target travel trajectory that is set for a road on which a vehicle travels.
Figure 4:
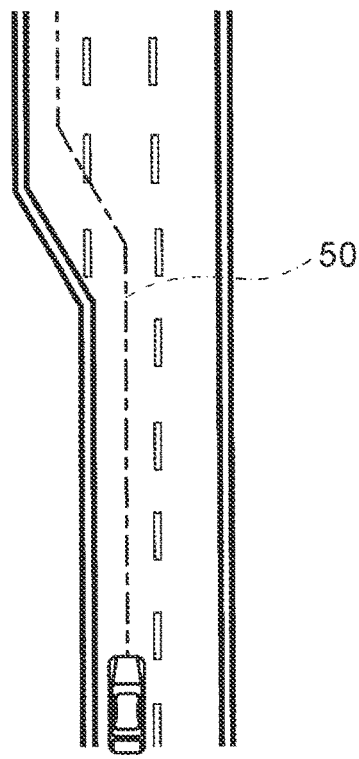
FIG. 4 is a diagram showing an example of a target travel trajectory that is set for a road on which a vehicle travels.

In S3, the CPU 41 sets a target travel trajectory 50, namely an aimed travel trajectory, for a road on which the vehicle is to travel, based on the planned travel route obtained in S1 and the lane information obtained in S2. Of the lanes of the road included in the planned travel route, the centerline of the lane in which the vehicle should travel is basically set as the target travel trajectory 50 in the direction in which the vehicle is traveling. For example, FIG. 3 shows an example in which the vehicle travels along a road with two lanes in each direction. In this case, the centerline of the left lane, namely the lane in which the vehicle should travel, is set as the target travel trajectory 50. FIG. 4 shows an example in which a lane is added on the left and the vehicle makes a left turn or diverges to the left afterward. In this case, the centerline of the left lane is set as the target travel trajectory 50 up to the point where a lane is added, and the centerline of the added lane is set as the target travel trajectory 50 after the point where the lane is added. The target travel trajectory may be set for the entire planned travel route, or may be set for only a predetermined distance (e.g., 300 m) from the vehicle's current position. In the latter case, the steps S1 to S3 are repeated every time the vehicle travels the predetermined distance.

Subsequently, in S4, the CPU 41 sets a parameter $X_{n-1}$ indicating a previous exclusion range distance to an initial value. The initial value is, e.g., 5 m, but may be changed as appropriate. The initial value may be changed based on the type of autonomous driving assistance being currently executed in the vehicle. The exclusion range distance is a parameter that is used to generate a control trajectory to be followed by the vehicle (S6) as described later. Details will be described later. The parameter $X_{n-1}$ is stored in the RAM 42 etc.

The following steps S5 to S9 are repeatedly performed at predetermined intervals (e.g., every 100 msec) while the accessory power supply (ACC power supply) of the vehicle is on. The autonomous driving assistance program is terminated after the ACC power supply of the vehicle is turned off.

First, in S5, the CPU 41 determines if autonomous driving assistance is being executed in the current vehicle. For example, autonomous driving assistance can be started or terminated by user's operation of the autonomous driving start button etc. Autonomous driving assistance may be terminated when a situation arises where it is difficult to execute autonomous driving assistance (e.g., in the case where a lane marking or markings of the vehicle's lane disappear, etc.).

If it is determined that autonomous driving assistance is being executed (S5: YES), the routine proceeds to S6. If it is determined that autonomous driving assistance is not being executed (S5: NO), the autonomous driving assistance program is terminated without generating a control trajectory and executing autonomous driving assistance based on the generated control trajectory.

In S6, the CPU 41 executes control trajectory generation processing (FIG. 5) that will be described later. The control trajectory generation processing is processing of generating a control trajectory, namely a trajectory to be followed by the vehicle. A control trajectory is generated for a section from the vehicle's current position to a position located ahead of the vehicle's current position in the direction in which the vehicle is traveling by a stopping distance (the distance the vehicle travels from the time the driver realizes that he/she needs to brake until the vehicle comes to a stop), as described later. The control trajectory is a trajectory for the vehicle to follow the target travel trajectory set in S3 as much as possible. For example, in the case where the vehicle's current position is on or around the target travel trajectory, the control trajectory is a trajectory for the vehicle to stay around the target travel trajectory. In the case where the vehicle's current position has deviated from the target travel trajectory, the control trajectory is a trajectory for the vehicle to return toward the target travel trajectory.

Next, in S7, the CPU 41 reads the parameter $X_{n-1}$ indicating the previous exclusion range distance and stored in the RAM 42, and substitutes particularly the exclusion range distance $X_n$ that has been first set (travel time is 0) out of the exclusion range distances $X_n$ used to generate the control trajectory in the most recently performed step S6 for the parameter $X_{n-1}$.

In S8, the CPU 41 calculates controlled variables that allow the vehicle to follow the control trajectory generated in S6. Specifically, accelerator, brake, gear, and steering controlled variables are calculated.

Thereafter, in S9, the CPU 41 reflects the controlled variables calculated in S8. Specifically, the CPU 41 transmits the calculated controlled variables to the vehicle control ECU 20 via the CAN. The vehicle control ECU 20 performs vehicle control, namely control of the accelerator, brake, gear, and steering, based on the received controlled variables. Driving assistance control can thus be performed so that the vehicle follows the generated control trajectory.

An optimal control trajectory for the vehicle to follow a target travel trajectory can be generated from the most recently detected current position and bearing of the vehicle and autonomous driving assistance for the vehicle to travel along the control trajectory can be executed by repeatedly performing the steps S5 to S9 at regular intervals (e.g., every 100 msec).

Figure 5:
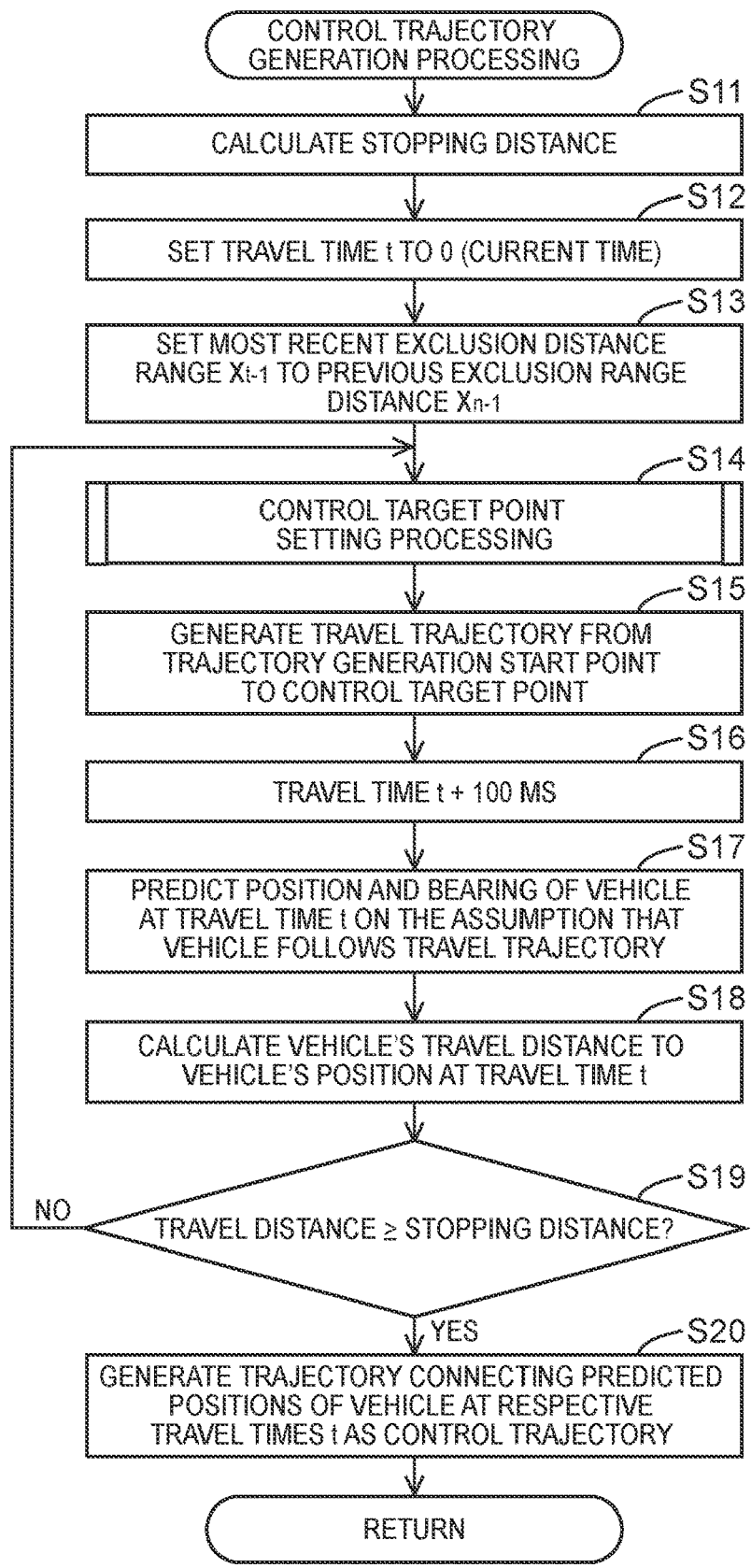
FIG. 5 is a flowchart of a sub-processing program of control trajectory generation processing.

Sub-processing of the control trajectory generation processing that is executed in S6 will be described based on FIG. 5. FIG. 5 is a flowchart of a sub-processing program of the control trajectory generation processing.

First, in S11, the CPU 41 calculates the current "stopping distance" of the vehicle from the current speed of the vehicle. The "stopping distance" is the distance the vehicle travels from the time the driver realizes that he/she needs to brake until the vehicle comes to a stop, and is the sum of the thinking distance and the braking distance for stopping at a deceleration of 0.2 G. Since a specific method for calculating the stopping distance is known in the art, detailed description thereof will be omitted.

Next, in S12, the CPU 41 sets travel time t, which is a parameter, to an initial value of 0 (0 means current time). The travel time t is stored in the RAM 42 etc.

Then, in S13, the CPU 41 substitutes the parameter $X_{n-1}$ indicating the previous exclusion range distance for a parameter $X_{t-1}$ indicating the most recent exclusion range distance. The parameter $X_{n-1}$ indicating the previous exclusion range distance is set in S4 or S7. The parameter $X_{t-1}$ is stored in the RAM 42 etc.

Subsequently, in S14, the CPU 41 executes control target point setting processing (FIG. 9) that will be described later. The control target point setting processing is processing of setting a control target point, namely a target point to be used to generate a control trajectory. As described later, the control target point is set to a position that is located on a target travel trajectory and ahead of a trajectory generation start point in the direction in which the vehicle is traveling by the distance based on the type of autonomous driving assistance being executed in the vehicle. The trajectory generation start point is a predicted position of the vehicle at the current travel time t (after time t from current time) and is specified in S17 that will be described later. In particular, in the case where the travel time t is an initial value of 0, the trajectory generation start point is the vehicle's current position.

Thereafter, in S15, the CPU 41 generates a trajectory from the trajectory generation start point to the control target point set in S14 (hereinafter referred to as the travel trajectory). Specifically, the vehicle generates as a travel trajectory a trajectory for the vehicle to travel from the trajectory generation start point to the control target point at a current vehicle speed at a predetermined steering angle or less. The trajectory generation start point is a predicted position of the vehicle at the current travel time t (after time t from current time). The bearing of the vehicle at the trajectory generation start point is specified in S17 that will be described later.

Subsequently, in S16, the CPU 41 reads the travel time t from the RAM 42 and increments the travel time t by 100 msec.

Then, in S17, the CPU 41 predicts the position and bearing of the vehicle at the current travel time t (after time t from current time) on the assumption that the vehicle travels at a current vehicle speed from the trajectory generation start point of the travel trajectory generated in S15 along the travel trajectory. Specifically, the CPU 41 predicts that the point located at a distance that would be traveled if the vehicle traveled at a current vehicle speed for 100 ms along the travel trajectory generated in S15 ahead from the trajectory generation start point is the position of the vehicle at the current travel time t (after time t from current time). The CPU 41 also predicts that the direction tangential to the travel trajectory at the predicted position of the vehicle is the bearing of the vehicle at the current travel time t (after time t from current time).

Thereafter, in S18, the CPU 41 calculates the travel distance of the vehicle from the vehicle's position at the travel time t=0 (i.e., current time) to the vehicle's position at the current travel time t, namely the vehicle's position predicted in S17. The CPU 41 calculates the travel distance on the assumption that the vehicle follows a trajectory connecting the vehicle's positions that have been predicted every travel time t.

Next, in S19, the CPU 41 determines if the travel distance calculated in S18 is equal to or larger than the stopping distance calculated in S11.

If it is determined that the travel distance calculated in S18 is smaller than the stopping distance calculated in S11 (S19: NO), the routine returns to S14. Setting of a control target point and generation of a travel trajectory are then performed again by using as a trajectory generation start point the new predicted position of the vehicle at the travel time t incremented in S16 (after time t from current time). The steps S14 to S18 are repeatedly performed with the travel time t being increased in increments of 100 msec, until it is determined that the travel distance calculated in S18 is equal to or larger than the stopping distance calculated in S11.

Figure 6:
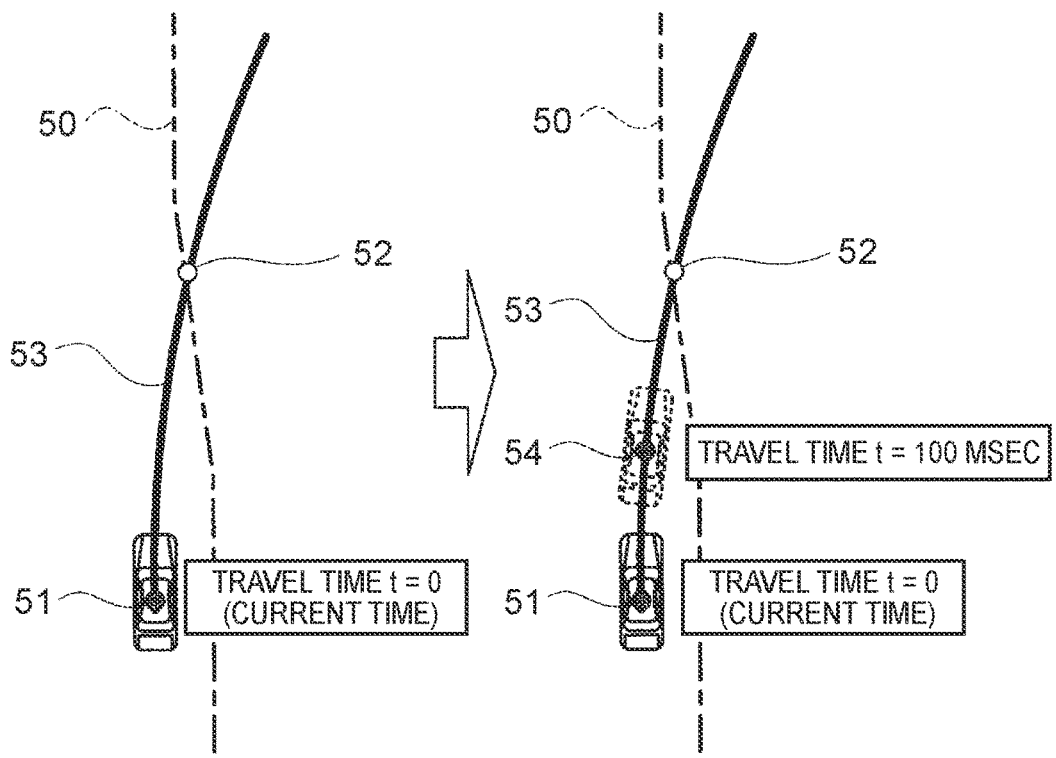
FIG. 6 is a diagram showing a predicted vehicle position in the case where travel time t is 100 msec.

For example, as shown in FIG. 6, in the case where the travel time t is an initial value of 0 (i.e., current time), a control target point 52 is set on the target travel trajectory 50 by using the vehicle's current position as a trajectory generation start point 51. A travel trajectory 53 from the trajectory generation start point 51 to the control target point 52 is thus generated. Moreover, a vehicle's position 54 after 100 msec from current time is predicted on the assumption that the vehicle has traveled for 100 msec along the generated travel trajectory 53.

Figure 7:
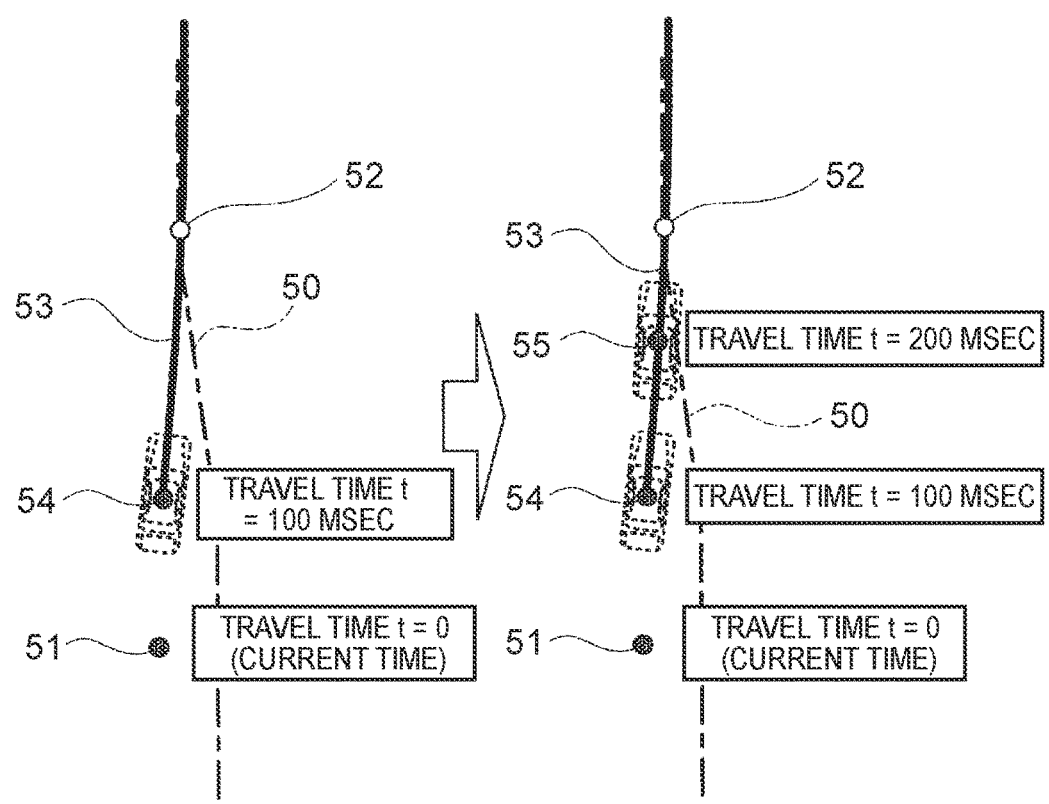
FIG. 7 is a diagram showing a predicted vehicle position in the case where travel time t is 200 msec.

Next, as shown in FIG. 7, a new control target point 52 is set on the target travel trajectory 50 by using the vehicle's position 54 after 100 msec (i.e., the predicted position of the vehicle in the case where the travel time t is 100 msec) as a new trajectory generation start point 51. A travel trajectory 53 from the trajectory generation start point 51 to the control target point 52 is thus similarly generated. Moreover, a vehicle's position 55 after 200 msec from current time is predicted on the assumption that the vehicle has traveled for 100 msec along the generated travel trajectory 53.

A vehicle's position after 300 msec from current time, a vehicle's position after 400 msec from current time, . . . are similarly predicted until it is determined that the travel distance of the vehicle is equal to or larger than the stopping distance.

If it is determined that the travel distance calculated in S18 is equal to or larger than the stopping distance calculated in S11 (S19: YES), the routine proceeds to S20. In S20, the CPU 41 generates as a control trajectory a trajectory connecting the vehicle's positions at respective travel times t (t=0, 100 msec, 200 msec, 300 msec, . . . ) which have been specified by repeatedly performing the steps S14 to S18. The bearings of the vehicle at respective positions are also considered when connecting the vehicle's positions at respective travel times t. The bearings of the vehicle at respective positions have been specified in S17. It is desirable to connect the vehicle's positions so that the number of turns is small and the turning radius is as large as possible.

Figure 8:
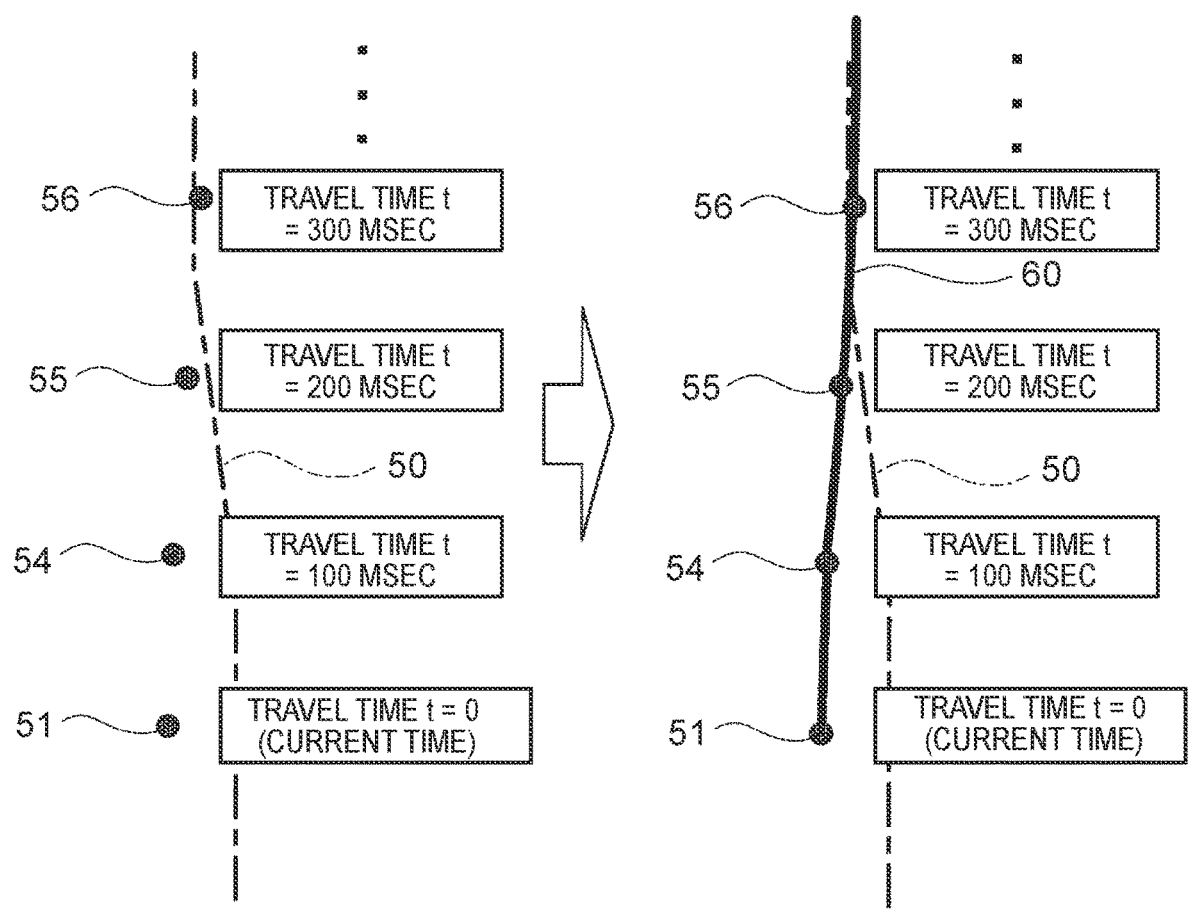
FIG. 8 is a diagram illustrating a method for generating a control trajectory.

For example, as shown in FIG. 8, in the case where a vehicle's position 51 at current time (travel time t=0), a vehicle's position 54 after 100 msec from current time (travel time t=100 msec), a vehicle's position 55 after 200 msec from current time (travel time t=200 msec), and a vehicle's position 56 after 300 msec from current time (travel time t=300 msec) have been specified for the target travel trajectory 50, a trajectory connecting the vehicle's positions 51, 54, 55, 56 is generated as a control trajectory 60.

The control trajectory 60 may be generated by connecting a part of the travel trajectories 53 generated in S15. That is, a trajectory connecting the travel trajectory 53 from the trajectory generation start point 51 to the predicted vehicle's position 54 shown in FIG. 6 and the travel trajectory 53 from the trajectory generation start point 51 to the predicted vehicle's position 55 shown in FIG. 7 may be generated as a control trajectory 60.

Figure 9:
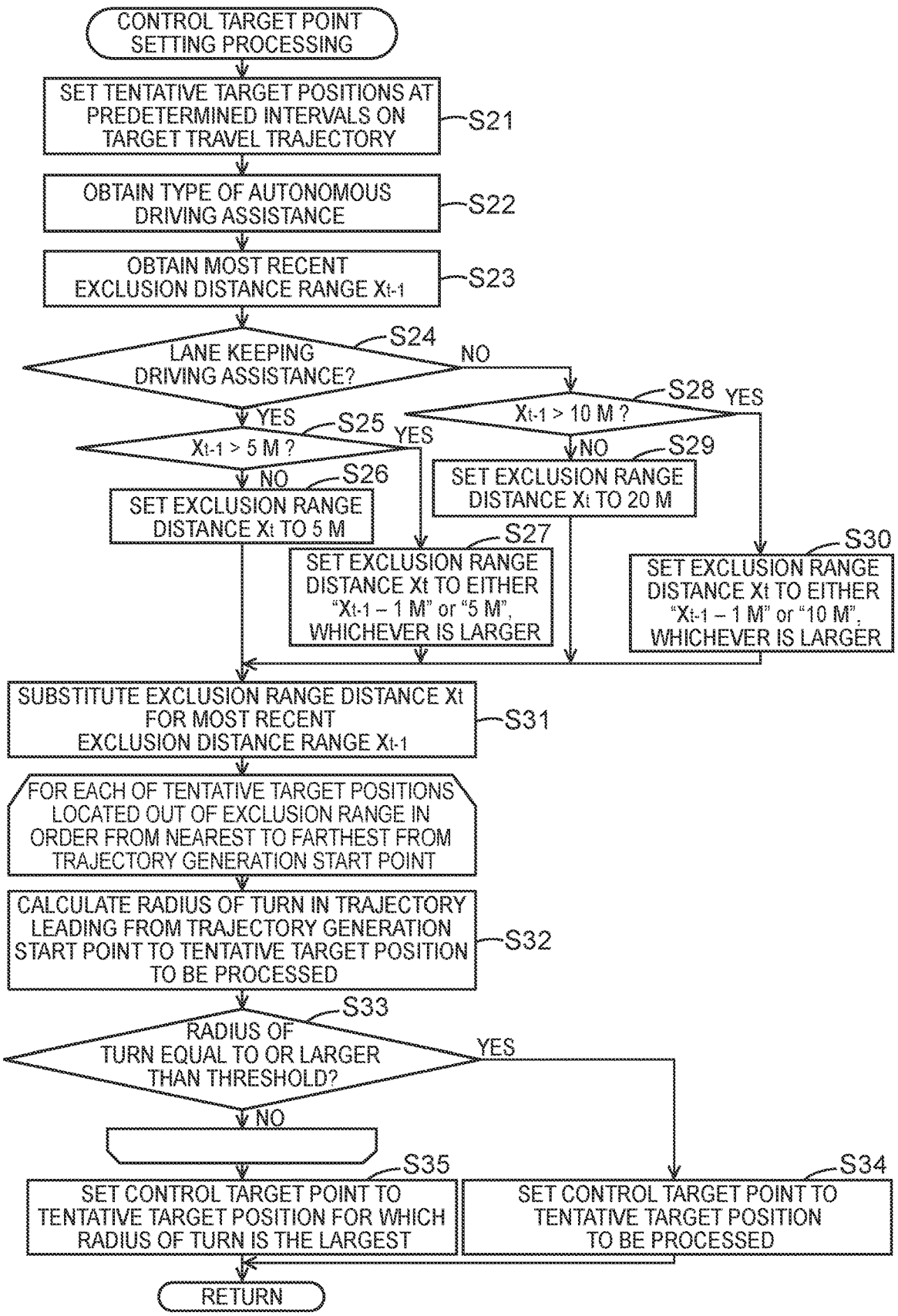
FIG. 9 is a flowchart of a sub-processing program of control target point setting processing.

Sub-processing of the control target point setting processing that is executed in S14 will be described based on FIG. 9. FIG. 9 is a flowchart of a sub-processing program of the control target point setting processing.

First, in S21, the CPU 41 sets tentative target positions at predetermined intervals on the target travel trajectory set in S3. The tentative target positions are candidates for a control target point. A more optimal control target point can be selected by setting a larger number of tentative target positions at shorter intervals. However, this increases the processing burden on the CPU 41. For example, the tentative target positions are set at intervals of 1 m. The tentative target positions may be set for the entire target travel trajectory or may be set only for a part of the target travel trajectory which is located around the vehicle's current position.

Next, in S22, the CPU 41 obtains the type of autonomous driving assistance that is currently being executed in the vehicle. In the present embodiment, either "lane keeping driving assistance" or "lane change assistance" is basically performed except under special circumstances such as right and left turns, merges, and diverges, as described above.

In S23, the CPU 41 reads a parameter $X_{t-1}$ indicating the most recent exclusion range distance and stored in the RAM 42. The parameter $X_{t-1}$ indicating the most recent exclusion range distance is set in S13 or S31 that will be described later.

Thereafter, in S24, the CPU 41 determines if the type of autonomous driving assistance that is being currently executed in the vehicle is "lane keeping driving assistance" or "lane change assistance," based on the result obtained in S22.

If it is determined that the type of autonomous driving assistance that is being currently executed in the vehicle is "lane keeping driving assistance" (S24: YES), the routine proceeds to S25. If it is determined that the type of autonomous driving assistance that is being currently executed in the vehicle is "lane change assistance" (S24: NO), the routine proceeds to S28.

In S25, the CPU 41 determines if the most recent exclusion range distance $X_{t-1}$ obtained in S23 is larger than 5 m. The most recent exclusion range distance $X_{t-1}$ is particularly the value of the exclusion range distance set in the most recent control target point setting processing (S14) out of the control target point setting processing (S14) that have been executed to generate a current control trajectory. In the case where the travel time t is 0, that is, in the case where this is the first control target point setting processing that has been executed to generate a current control trajectory, the most recent exclusion range distance $X_{t-1}$ is the value of the exclusion range distance set to generate the previous control trajectory (S7, S13). The exclusion range distance is the distance that defines the extent of the range (hereinafter referred to as the exclusion range) to be excluded from selection of a control target point when a control target point is selected from the tentative target positions as described later. Specifically, the exclusion range is a range with a radius of the exclusion range distance about the trajectory generation start point.

If it is determined that the most recent exclusion range distance $X_{t-1}$ is larger than 5 m (S25: YES), the routine proceeds to S27. If it is determined that the most recent exclusion range distance $X_{t-1}$ is equal to or smaller than 5 m (S25: NO), the routine proceeds to S26.

In S26, the CPU 41 sets the current exclusion range distance $X_t$ to 5 m. The routine then proceeds to S31.

In S27, the CPU 41 sets the current exclusion range distance $X_t$ to either "$X_{t-1}$-1 m" or "5 m", whichever is larger. The routine then proceeds to S31.

In S28, the CPU 41 determines if the most recent exclusion range distance $X_{t-1}$ obtained in S23 is larger than 10 m.

If it is determined that the most recent exclusion range distance $X_{t-1}$ is larger than 10 m (S28: YES), the routine proceeds to S30. If it is determined that the most recent exclusion range distance $X_{t-1}$ is equal to or smaller than 10 m (S28: NO), the routine proceeds to S29.

In S29, the CPU 41 sets the current exclusion range distance $X_t$ to 20 m. The routine then proceeds to S31.

In S30, the CPU 41 sets the current exclusion range distance $X_t$ to either "$X_{t-1}$-1 m" or "10 m", whichever is larger. The routine then proceeds to S31

The exclusion range, that is, the range to be excluded from selection of a control target point when a control target point is selected from a plurality of tentative target positions, is set by performing the steps S26, S27, S29, S30. In the case where a large exclusion range is set, it takes time to correct a trajectory if the vehicle's current position has deviated from the target travel trajectory, but the resultant control trajectory includes a gentler turn or turns involving a smaller change in bearing of the vehicle. However, in the case where a small exclusion range is set, a trajectory can be corrected in a short time if the vehicle's current position has deviated from the target travel trajectory, but the resultant control trajectory tends to include a sharp turn or turns.

In the case where "lane keeping driving assistance" is being executed in the vehicle, a small exclusion range 61 (e.g., a range with a radius of 5 m about the trajectory generation start point 51) is basically set as shown in FIG. 10 (S26). In the case where "lane keeping driving assistance" is being executed in the vehicle, being able to correct the traveling position relatively quickly is more advantageous because the vehicle is less likely to deviate from the centerline of the lane and swaying is restrained. In the case where "lane keeping driving assistance" is being executed, it is therefore often more advantageous to set a control target point to a relatively nearby position. Accordingly, a small exclusion range 61 is basically set.

However, in the case where "lane keeping driving assistance" is being executed in the vehicle but a large exclusion range (e.g., the exclusion range distance >5 m) was set in the processing for the previous travel time t, the exclusion range is not switched to a small exclusion range in one step but is gradually switched to a small exclusion range in a plurality of steps (S27). Specifically, the exclusion range distance is decremented by 1 m every time the travel time t is incremented by 100 ms (the minimum exclusion range distance is 5 m). If the control target point is rapidly changed from a position far away from the trajectory generation start point 51 to a position close to the trajectory generation start point 51, the radius of turn in the resultant control trajectory may be rapidly reduced (lateral acceleration may be rapidly increased). In the present embodiment, this problem is solved by reducing the exclusion range in steps in the case where the exclusion range is to be reduced. In the case where the exclusion range is to be increased, the exclusion range may be increased in one step rather than in a plurality of steps because the above problem does not occur.

In the case where "lane change assistance" is being executed in the vehicle, a large exclusion range (e.g., a range with a radius of 20 m about the trajectory generation start point 51) is initially basically set as shown in FIG. 11 (S29). Thereafter, the exclusion range distance is decremented by 1 m every time the travel time t is incremented by 100 ms in order to continue "lane change assistance" (S30, the minimum exclusion range distance is 10 m). In the case where "lane change assistance" is being executed in the vehicle, it is preferable, unless a quick lane change is required, to relatively gradually change the traveling position to move the vehicle such that the vehicle body does not make an excessively large angle to the lane. In the case where "lane change assistance" is being executed, it is therefore often more advantageous to set a control target point to a relatively far position. Accordingly, an exclusion range 61 larger than that for "lane keeping driving assistance" is set. In particular, a large exclusion range is initially set at the start of lane change control, whereby lane change control is more smoothly performed. In the case where the exclusion range is to be reduced from the initial exclusion range, the exclusion range is reduced in steps as in the case where "lane keeping driving assistance" is being executed, whereby a rapid decrease in radius of turn in the resultant control trajectory (a rapid increase in lateral acceleration) is prevented.

FIG. 12 is a table showing a specific example of setting an exclusion range for various travel times t. In FIG. 12, an example will be described in which "lane keeping driving assistance" is executed as autonomous driving assistance for the travel time t of 0 ms (current time) to 100 ms, "lane change assistance" is executed for the travel time t of 200 ms to 1,400 ms, and "lane keeping driving assistance" is executed again for the travel time t of 1,500 ms and later.

As shown in FIG. 12, for the travel time t of 0 ms to 100 ms during which "lane keeping driving assistance" is executed as autonomous driving assistance, the exclusion range distance is 5 m, and the exclusion range is set to a range with a radius of 5 m about the trajectory generation start point 51 (S26). When the type of autonomous driving assistance is switched from "lane keeping driving assistance" to "lane change control" at the travel time t of 200 ms, the exclusion range distance is switched from 5 m to 20 m in one step, and the exclusion range is set to a range with a radius of 20 m about the trajectory generation start point 51 (S29). For the travel time t of 200 ms to 1,400 ms, "line keeping assistance" is continuously executed. The exclusion range distance is therefore gradually reduced from 20 m and the exclusion range is also gradually reduced accordingly (S30). However, the lower limit of the exclusion range distance is 10 m. Accordingly, once the exclusion range distance is reduced to 10 m, the exclusion range distance is maintained without being reduced any more. When the type of autonomous driving assistance is switched from "lane change control" to "lane keeping driving assistance" at the travel time t of 1,500 ms, the exclusion range distance is gradually reduced from 10 m to 5 m in a plurality of steps. Specifically, the exclusion range is decremented by 1 m every time the travel time t is incremented by 100 ms. The exclusion range is also gradually reduced accordingly (S27). Once the exclusion range distance is reduced to 5 m, the exclusion range distance is maintained without being reduced any more.

Thereafter, in S31, the CPU 41 reads the parameter $X_{t-1}$ indicating the most recent exclusion range distance and stored in the RAM 42 and substitutes the current exclusion range distance $X_t$ set in any of S26, S27, S29, S30 for the parameter $X_{t-1}$ (updates the parameter $X_{t-1}$ with the current exclusion range distance $X_t$).

Figure 13:
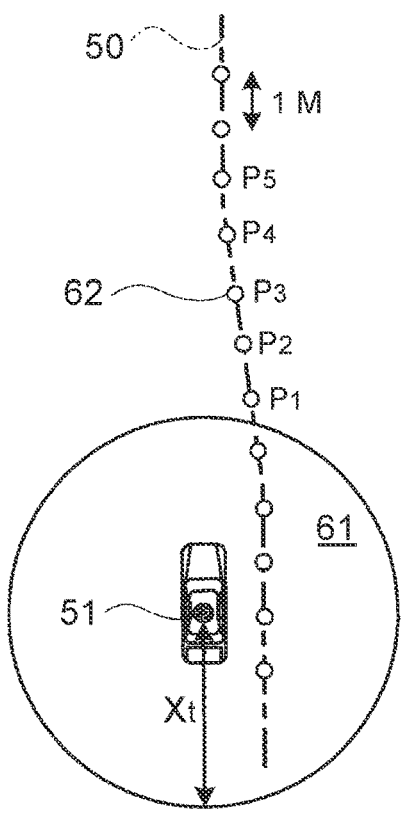
FIG. 13 is a diagram showing tentative target positions that are set on a target travel trajectory.

Of the tentative target positions set in S21, the following steps S32, S33 are performed for each of the tentative target positions that are candidates for a control target point in order from nearest to farthest from the trajectory generation start point. The tentative target positions that are candidates for a control target point are those tentative target positions which are located out of the exclusion range set in S26, S27, S29, S30 and within a predetermined distance (e.g., within 300 m) from the trajectory generation start point 51. For example, in the example of FIG. 13, tentative target positions 62 have been set at predetermined intervals (e.g., intervals of 1 m) for the target travel trajectory 50, but those tentative target positions 62 which are located within the exclusion range 61 with a radius of the current exclusion range distance $X_t$ about the trajectory generation start point 51 are excluded from candidates for a control target point. The steps S32, S33 are first performed for the point P1 located closest to the trajectory generation start point 51 out of the tentative target positions 62 located out of the exclusion range 61. The steps S32, S33 are then performed in order of P2, P3, . . . .

First, in S32, the CPU 41 generates a trajectory leading from the trajectory generation start point to the tentative target position to be processed (hereinafter referred to as the leading trajectory). Specifically, the CPU 41 generates as a leading trajectory a trajectory connecting the trajectory generation start point and the tentative target position to be processed with the largest possible radius of turn. Moreover, in S32, the CPU 41 calculates the smallest radius of turn in turns included in the generated leading trajectory. That is, the minimum radius of turn required to travel from the trajectory generation start point to the tentative target position to be processed is calculated in S32. The trajectory generation start point is a predicted position of the vehicle at the current travel time t (after time t from current time) and is specified in S17. In particular, in the case where the travel time t is an initial value of 0, the trajectory generation start point is the vehicle's current position.

Next, in S33, the CPU 41 determines if the radius of turn calculated in S32 is equal to or larger than a threshold. The threshold is the smallest radius of turn that allows driving control of the traveling vehicle which is associated with autonomous driving assistance to be appropriately performed and that satisfies a condition that does not place a burden on an occupant or occupants of the traveling vehicle. For example, if the condition is that the lateral acceleration is 0.2 G or less, the threshold is calculated by the following expression (1).

$$\text{Threshold} = (\text{vehicle speed})^2 / (0.2 \text{ G} \times 9.80665) \tag{1}$$

If it is determined that the radius of turn calculated in S32 is equal to or larger than the threshold (S33: YES), the routine proceeds to S34. In S34, the CPU 41 sets the control target point to the tentative target position to be processed. That is, the CPU 41 preferentially sets the control target position to the tentative target position that is located out of the exclusion range and closer to the trajectory generation start point. However, in the case where there is an obstacle ahead in the direction in which the vehicle is traveling, it is desirable that any tentative target position that creates a leading trajectory overlapping the obstacle be excluded from selection of a control target point. Information about obstacles is obtained from the obstacle information DB 32.

If it is determined that the radius of turn calculated in S32 is smaller than the threshold (S33: NO), the CPU 41 switches the tentative target position to be processed to another tentative target position that is the second closest to the trajectory generation start point, and then performs the step S32 again. If, as a result of performing the steps S32, S33 for all the tentative target positions to be processed, there is no tentative target position for which the radius of turn is equal to or larger than the threshold, the routine proceeds to S35.

In S35, the CPU 41 sets the control target point to the tentative target position for which the radius of turn calculated in S32 is the largest out of the tentative target positions to be processed. If there are a plurality of tentative target positions for which the radius of turn is the largest, the CPU 41 sets the control target point to one of the plurality of tentative target positions which is located closest to the trajectory generation start point.

Figure 14:
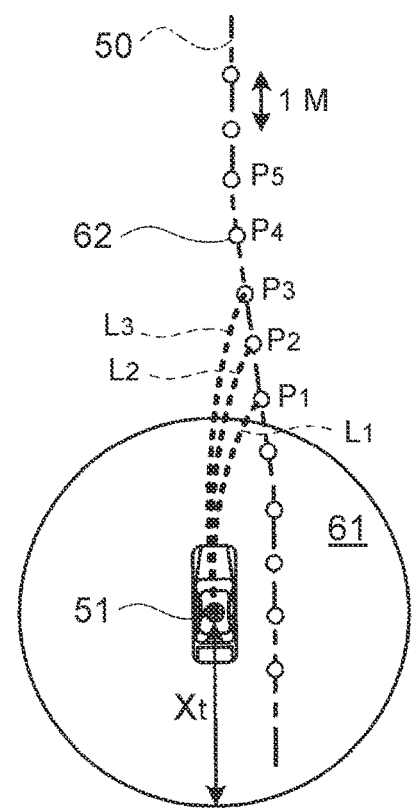
FIG. 14 is a diagram illustrating a selection method for selecting a control target point from tentative target positions.

In the case where the tentative target positions 62 have been set at predetermined intervals for the target travel trajectory 50 as shown in FIG. 14, the CPU 41, as a result of performing the steps S32 to S35, generates a leading trajectory L1 leading to the point P1 that is located closest to the trajectory generation start point 51 out of those tentative target positions 62 which are located out of the exclusion range 61, and determines if the radius of turn is equal to or larger than the threshold. If the radius of turn of the leading trajectory L1 is smaller than the threshold, the CPU 41 generates a leading trajectory L2 leading to the point P2 that is the second closest to the trajectory generation start point 51, and determines if the radius of turn is equal to or larger than the threshold. If the radius of turn of the leading trajectory L2 is smaller than the threshold, the CPU 41 generates a leading trajectory L3 leading to the point P3 that is the third closest to the trajectory generation start point 51, and determines if the radius of turn is equal to or larger than the threshold. Similarly, the CPU 41 sequentially determines if the radius of turn of a leading trajectory leading to each point is equal to or larger than the threshold for the points in order from nearest to farthest from the trajectory generation start point 51. The CPU 41 thus sets the control target point to the tentative target position 62 for which the radius of turn is equal to or larger than the threshold and which is located closest to the trajectory generation start point 51. If there is no tentative target position 62 for which the radius of turn is equal to or larger than the threshold, the CPU 41 sets the control target point to the tentative target position 62 for which the radius of turn is the largest out of those tentative target positions 62 which are located out of the exclusion range 61.

As described in detail above, in the navigation system 1 and the computer program that is executed by the navigation system 1 according to the present embodiment, the target travel trajectory 50, namely an aimed travel trajectory for the road on which the vehicle travels, is set (S3), the control target point 52 is set to a position that is located on the target travel trajectory 50 and ahead of the trajectory generation start point 51 in the direction in which the vehicle is traveling by the distance based on the type of autonomous driving assistance being executed in the vehicle (S14), and the control trajectory 60 to be followed by the vehicle is generated by using the trajectory from the trajectory generation start point 51 to the control target point 52 (S20). A control trajectory having a shape corresponding to the type of autonomous driving assistance can therefore be generated in the case where the vehicle is traveling with autonomous driving assistance. For example, generation of a control trajectory with a small radius of turn is therefore prevented during execution of autonomous driving assistance in which driving with sharp turns is not appropriate. Generation of a control trajectory that causes frequent changes in bearing of the vehicle is also prevented during execution of autonomous driving assistance in which frequent changes in angle of the vehicle body are not appropriate. As a result, autonomous driving assistance can be continuously and appropriately executed.

It is to be understood that the above embodiments need not be limiting and various improvements and modifications can be made without departing from the spirit and scope of the broad inventive principles.

For example, in the present embodiment, "lane keeping driving assistance" and "lane change assistance" are particularly described as examples of autonomous driving assistance that is executed for the vehicle. However, other types of autonomous driving assistance may be executed. Examples of other types of autonomous driving assistance include autonomous driving assistance in which the vehicle is controlled to keep a certain distance (e.g., 10 m) from a vehicle ahead and autonomous driving assistance in which the vehicle is controlled to travel at a constant speed (e.g., 80% of speed limit). A control trajectory having a shape corresponding to the type of autonomous driving assistance can be generated by setting the exclusion range distance as appropriate according to the type of autonomous driving assistance.

In the present embodiment, the exclusion range distance is basically set to 5 m when "lane keeping driving assistance" is being executed, and the exclusion range distance is basically set to 10 m to 20 m when "lane change assistance" is being executed. However, this distance can be changed as appropriate. For example, in the case where there is an obstacle nearby, the exclusion range distance may be set to a shorter distance (e.g., 2.5 m).

In the present embodiment, in the case where "lane change assistance" is continuously executed, the exclusion range distance is set so as to gradually decrease with time. However, the exclusion range distance may also be set so as to decrease with time even in the case where "lane keeping driving assistance" is continuously executed. The exclusion range distance may not be reduced, namely may be a fixed distance, even in the case where "lane change assistance" is continuously executed.

In the present embodiment, autonomous driving assistance that is executed so that the vehicle travels autonomously without user's driving maneuvers is described as the vehicle control ECU 20 controlling all of an accelerator operation, a brake operation, and a steering wheel operation, which are maneuvers related to the vehicle behavior out of vehicle maneuvers. In autonomous driving assistance, however, the vehicle control ECU 20 may control at least one of the accelerator operation, the brake operation, and the steering wheel operation, which are the maneuvers related to the vehicle behavior out of the vehicle maneuvers. Manual driving based on user's driving maneuvers is herein described as the user performing all of the accelerator operation, the brake operation, and the steering wheel operation, which are the maneuvers related to the vehicle behavior out of the vehicle maneuvers.

In the present embodiment, the navigation system 1 executes the autonomous driving assistance program (FIG. 2). However, the vehicle control ECU 20 may execute the autonomous driving assistance program. In that case, the vehicle control ECU 20 obtains the vehicle's current position, map information, etc. from the navigation system 1.

The above embodiments are applicable to devices having a route search function, in addition to navigation systems. For example, the mobile phones, smartphones, tablet computers, personal computers, etc. (hereinafter referred to as the "mobile terminals etc.") may be used. Systems formed by a server and a mobile terminal etc. may be used. In that case, each step of the autonomous driving assistance program described above (see FIG. 2) may be performed by either the server or the mobile terminal etc. When a mobile terminal etc. is used, a vehicle capable of executing autonomous driving assistance and the mobile terminal etc. need to be connected (either wired or wireless) so that they can communicate with each other.

Although the embodiment of the autonomous driving assistance device is described above, the autonomous driving assistance device may have the following configurations. In that case, the autonomous driving assistance device has the following effects.

For example, a first configuration is as follows.

An autonomous driving assistance device (1) for generating assistance information to be used in autonomous driving assistance that is executed in a vehicle includes: travel trajectory setting means (41) for setting a target travel trajectory (50) that is an aimed travel trajectory for a road on which the vehicle travels; control target point setting means (41) for setting a control target point (52) to a position that is located on the target travel trajectory and ahead of a trajectory generation start point (51) in a direction in which the vehicle is traveling by the distance based on a type of autonomous driving assistance being executed in the vehicle; and control trajectory generating means (41) for generating a control trajectory (60) to be followed by the vehicle by using a trajectory from the trajectory generation start point to the control target point.

According to the autonomous driving assistance device having the above configuration, a control trajectory having a shape corresponding to the type of autonomous driving assistance can be generated in the case where a vehicle is traveling with autonomous driving assistance. For example, generation of a control trajectory with a small radius of turn is therefore prevented during execution of autonomous driving assistance in which driving with sharp turns is not appropriate. Generation of a control trajectory that causes frequent changes in bearing of the vehicle is also prevented during execution of autonomous driving assistance in which frequent changes in angle of the vehicle body are not appropriate. As a result, autonomous driving assistance can be continuously and appropriately executed.

A second configuration is as follows.

The trajectory generation start point (51) is a predicted position of the vehicle after a predetermined time, the predicted position being obtained on the assumption that the vehicle follows a trajectory from a current position of the vehicle or the trajectory generation start point to the control target point (52).

According to the autonomous driving assistance device having the above configuration, trajectories running from the current position of the vehicle and from the position of the vehicle after the predetermined time as a start point toward the target travel trajectory are generated, and a final control trajectory is generated from the generated trajectories. Accordingly, a more appropriate control trajectory for moving the vehicle along the target travel trajectory can be generated by using the positional relationship between the vehicle's position that changes with time and the target travel trajectory.

A third configuration is as follows.

The control trajectory generating means (41) generates as the control trajectory a trajectory connecting the trajectory generation start point, and the predicted position of the vehicle after the predetermined time, the predicted position being obtained on the assumption that the vehicle follows trajectories from the current position of the vehicle and the trajectory generation start point to the control target point.

According to the autonomous driving assistance device having the above configuration, trajectories running from the current position of the vehicle and from the position of the vehicle after the predetermined time as a start point toward the target travel trajectory are generated, and a final control trajectory is generated by connecting the generated trajectories. Accordingly, a more appropriate control trajectory for moving the vehicle along the target travel trajectory can be generated by using the positional relationship between the vehicle's position that changes with time and the target travel trajectory.

A fourth configuration is as follows.

The autonomous driving assistance device (1) further includes: exclusion range setting means (41) for setting as an exclusion range (61) a range with a radius of an exclusion range distance about the trajectory generation start point (51), the exclusion range distance being a distance set based on the type of autonomous driving assistance that is executed in the vehicle. The control target point setting means (41) preferentially sets the control target point (52) to a position that is located out of the exclusion range and closer to the trajectory generation start point (51).

According to the autonomous driving assistance device having the above configuration, the control target point is set to a position located at a certain distance from the trajectory generation start point. Control hunting is therefore prevented. For example, in the case where the control target point is set to a position close to the trajectory generation start point, vehicle control that is actually performed may not correspond to the generated control trajectory. However, such a problem is solved by the autonomous driving assistance device having the above configuration. Since the control target point is set to a position as close as possible to the trajectory generation start point within such a range that prevents control hunting, a control trajectory that follows the target travel trajectory as much as possible can be generated.

A fifth configuration is as follows.

The control target point setting means (41) sets the target control point on a condition that a minimum radius of turn in the trajectory leading from the trajectory generation start point (51) to the control target point (52) is equal to or larger than a threshold.

According to the autonomous driving assistance device having the above configuration, driving control of the traveling vehicle which is associated with autonomous driving assistance is appropriately performed and a control trajectory that does not place a burden on an occupant or occupants of the traveling vehicle is generated.

A sixth configuration is as follows.

When the type of autonomous driving assistance that is executed in the vehicle is switched from first assistance to second assistance, the exclusion range setting means (41) switches the exclusion range distance from a first distance corresponding to the first assistance to a second distance corresponding to the second assistance in a plurality of steps.

According to the autonomous driving assistance device having the above configuration, a rapid change in radius of turn in the generated control trajectory is prevented when the type of autonomous driving assistance that is executed in the vehicle is switched.

A seventh configuration is as follows.

The exclusion range setting means (41) switches the exclusion range distance from the first distance to the second distance in the plurality of steps in the case where the first distance is larger than the second distance, and switches the exclusion range distance from the first distance to the second distance in one step in the case where the second distance is smaller than the first distance.

According to the autonomous driving assistance device having the above configuration, a rapid decrease in radius of turn in the generated control trajectory (a rapid increase in lateral acceleration) is prevented when the type of autonomous driving assistance that is executed in the vehicle is switched. Since an increase in radius of turn in the generated control trajectory is permitted, a control trajectory having a shape corresponding to the switched type of autonomous driving assistance is quickly generated.

An eighth configuration is as follows.

The exclusion range setting means (41) gradually reduces the exclusion range distance in the case where the same autonomous driving assistance is continuously executed in the vehicle.

According to the autonomous driving assistance device having the above configuration, when lane change control is performed, the traveling position is initially relatively gradually changed and controlled variables are gradually increased, whereby lane change control is more smoothly performed A ninth configuration is as follows.

The autonomous driving assistance that is executed in the vehicle includes lane keeping driving assistance for keeping the vehicle in the same lane and lane change assistance for moving the vehicle to a different lane, and a larger exclusion range distance is set for the lane change assistance than for the lane keeping driving assistance.

According to the autonomous driving assistance device having the above configuration, in the case where lane keeping driving assistance is being executed in the vehicle, the target control point is set to a nearby position in order to quickly correct the traveling position, whereby deviation from the centerline of the lane and swaying are restrained. In the case where lane change assistance is being executed in the vehicle, the target control point is set to a far position in order to relatively gradually change the traveling position, whereby a control trajectory is generated which allows the vehicle to travel such that the vehicle body does not make an excessively large angle to the lane.

The invention claimed is:

1. An autonomous driving assistance device for generating assistance information to be used in autonomous driving assistance that is executed in a vehicle, comprising:
    a processor programmed to:
        set a target travel trajectory that is an aimed travel trajectory for a road on which the vehicle travels;
        set as an exclusion range a range with a radius of an exclusion range distance about a trajectory generation start point, the exclusion range distance being a distance set based on the type of autonomous driving assistance that is executed in the vehicle;
        set a control target point to a position that is located on the target travel trajectory and ahead of the trajectory generation start point in a direction in which the vehicle is traveling based on a type of autonomous driving assistance being executed in the vehicle, the control target point being set at a position that is located out of the exclusion range and closer to the trajectory generation start point; and
        generate a control trajectory to be followed by the vehicle by using a trajectory from the trajectory generation start point to the control target point.

2. The autonomous driving assistance device according to claim 1, wherein:
    the trajectory generation start point is a predicted position of the vehicle after a predetermined time, the predicted position being obtained on an assumption that the vehicle follows a trajectory from a current position of the vehicle or the trajectory generation start point to the control target point.

3. The autonomous driving assistance device according to claim 1, wherein the processor is programmed to:
    generate as the control trajectory a trajectory connecting the trajectory generation start point, and a predicted position of the vehicle after a predetermined time, the predicted position being obtained on an assumption that the vehicle follows trajectories from a current position of the vehicle and the trajectory generation start point to the control target point.

4. The autonomous driving assistance device according to claim 1, wherein:
    the autonomous driving assistance that is executed in the vehicle includes lane keeping driving assistance for keeping the vehicle in a same lane and lane change assistance for moving the vehicle to a different lane; and
    a larger exclusion range distance is set for the lane change assistance than for the lane keeping driving assistance.

5. The autonomous driving assistance device according to claim 1, wherein the processor is programmed to:
    set the target control point on a condition that a minimum radius of turn in the trajectory leading from the trajectory generation start point to the control target point is equal to or larger than a threshold.

6. The autonomous driving assistance device according to claim 1, wherein the processor is programmed to:
    when the type of autonomous driving assistance that is executed in the vehicle is switched from a first assistance to a second assistance, switch the exclusion range distance from a first distance corresponding to the first assistance to a second distance corresponding to the second assistance in a plurality of steps.

7. The autonomous driving assistance device according to claim 6, wherein the processor is programmed to:
    switch the exclusion range distance from the first distance to the second distance in the plurality of steps in a case where the first distance is larger than the second distance; and
    switch the exclusion range distance from the first distance to the second distance in one step in a case where the first distance is smaller than the second distance.

8. The autonomous driving assistance device according to claim 1, wherein the processor is programmed to:
    gradually reduce the exclusion range distance in a case where a same autonomous driving assistance is continuously executed in the vehicle.

9. A computer-readable storage medium storing a computer-executable program for generating assistance information to be used in autonomous driving assistance that is executed by a computer in a vehicle, the program causing the computer to execute functions comprising:
    setting a target travel trajectory that is an aimed travel trajectory for a road on which the vehicle travels;
    setting as an exclusion range a range with a radius of an exclusion range distance about a trajectory generation start point, the exclusion range distance being a distance set based on the type of autonomous driving assistance that is executed in the vehicle;
    setting a control target point to a position that is located on the target travel trajectory and ahead of the trajectory generation start point in a direction in which the vehicle is traveling based on a type of autonomous driving assistance being executed in the vehicle, the control target point being set at a position that is located out of the exclusion range and closer to the trajectory generation start point; and
    generating a control trajectory to be followed by the vehicle by using a trajectory from the trajectory generation start point to the control target point.

* * * * *